United States Patent [19]

Kamis et al.

[11] Patent Number: 4,898,910

[45] Date of Patent: Feb. 6, 1990

[54] MODULUS CONTROL IN SILICONE SEALANT

[75] Inventors: Russell P. Kamis, County of Bay; Jerome M. Klosowski, Bay City; Loren D. Lower, Midland, all of Mich.

[73] Assignee: Dow Corning Corporation, Midland, Mich.

[21] Appl. No.: 249,731

[22] Filed: Sep. 26, 1988

[51] Int. Cl.$^4$ .............................................. C08L 83/04
[52] U.S. Cl. ................................... 524/860; 524/425; 524/431; 524/430; 524/448; 524/588; 524/785; 524/788; 524/783; 528/17; 528/35
[58] Field of Search .................... 528/17, 35; 524/860, 524/588

[56] References Cited

U.S. PATENT DOCUMENTS

| | | | |
|---|---|---|---|
| 3,294,739 | 12/1987 | Weyenberg | 528/901 |
| 3,334,067 | 8/1987 | Weyenberg | 528/901 |
| 4,652,624 | 3/1987 | Allen et al. | 528/17 |
| 4,687,829 | 8/1987 | Chaffee et al. | 328/17 |
| 4,711,928 | 12/1987 | Lee et al. | 524/860 |

*Primary Examiner*—Melvyn I. Marquis
*Attorney, Agent, or Firm*—Edward C. Elliott

[57] ABSTRACT

A silicone sealant which is stable in the absence of moisture and cures upon exposure to moisture to give an elastomer with a controllable modulus is produced by mixing a polydiorganosiloxane having both vinyl and alkoxysilethylene endblocking, alkoxy silane crosslinker, titanium catalyst, and optional filler. The modulus is controlled by varying the ratio of vinyl to alkoxysilethylene endblocking present on the polymer.

4 Claims, No Drawings

MODULUS CONTROL IN SILICONE SEALANT

BACKGROUND OF THE INVENTION

1. Field of the Invention

This invention relates to silicone sealants which cure upon exposure to moisture comprising an alkoxysilethylene endblocked polydiorganosiloxane, alkoxy functional crosslinker, and titanium catalyst.

2. Background Information

Silicone sealants, of the type in which an alkoxy endblocked polymer is reacted with an alkoxy functional crosslinker in the presence of a titanium catalyst, having a greatly improved shelf life have been developed by use of a trialkoxysilalkylene endblocked polymer. These sealants have the desired improved shelf life, but in many cases have a modulus which is too high for the application.

One solution to this problem is taught in U.S. Pat. No. 4,687,829, issued Aug. 18, 1987, in which alkoxy functional polydiorganosiloxane having alkoxysilethylene ends is mixed with a combination of trifunctional or tetrafunctional silane crosslinker and difunctional silane chain extender. The cured composition can be adjusted for the desired elongation by varying the ratio of crosslinker to chain extender, but there must be at least 50 mole percent of crosslinker in the composition to ensure that the composition cures to a non-tacky surface.

A method of producing a one-part silicone elastomeric sealant which has improved shelf life in taught in U.S. Pat. No. 4,711,928, issued Dec. 8, 1987. This method mixes a diorganovinylsiloxy endblocked polymer, reinforcing filler and silazane, then converts the polymer to an alkoxysilethylene ended polymer by reaction with an alkoxy functional silane.

Another method of controlling the modulus of silicone sealant having alkoxy functionality and using a titanium catalyst is disclosed in this invention.

SUMMARY OF THE INVENTION

The modulus of a silicone sealant having alkoxysilalkylene ended polydiorganosiloxane, alkoxy crosslinker, and titanium catalyst can be reduced by using a polydiorganosiloxane having a combination of trialkoxysilalkylene radicals and vinyl radicals as the endblockers in place of the normal trialkoxysilethylene endblockers.

DESCRIPTION OF THE INVENTION

This invention relates to silicone sealant containing polydiorganosiloxane having alkoxy endblocking, alkoxy functional crosslinker and/or chain extender, and titanium catalyst, a method comprising (A) mixing in the absence of moisture (1) 100 parts by weight of a polymer mixture of the average formula

where each R is free of aliphatic unsaturation and is at least one selected from the group consisting of monovalent hydrocarbon, monovalent halohydrocarbon, and monovalent cyanoalkyl radicals of 1 to 18 inclusive carbon atoms, each D is selected from the group consisting of the vinyl radical and radicals of the formula

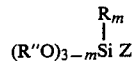

where each R" is at least one selected from the group consisting of methyl, ethyl, propyl, and butyl, Z is a divalent hydrocarbon radical or combination of divalent hydrocarbon radicals and siloxane radicals, m is 0 or 1, and x is of a value such that the polymer has a viscosity of from 0.5 to 3000 Pa.s at 25° C., from 3 to 40 percent of the total of endblocking radicals D in the polymer mixture being vinyl radicals, (2) from 0.1 to 14 parts by weight of an alkoxysilane of the formula

where R' is selected from the group consisting of methyl, ethyl, propyl, phenyl, and vinyl, R" is as defined above and a is 0, 1, or 2 and (3) from 0.2 to 6 parts by weight of titanium catalyst, and (4) optional filler, (B) storing the mixture in the absence of moisture, to give a sealant which is stable in the absence of moisture and has a modulus which is at a desired level after cure of the sealant.

The method of this invention allows the production of a moisture curable silicone sealant which has a long storage life and which can be formulated to give a variety of modulus values. The modulus is controlled by controlling the ratio of alkoxysilalkylene endblocks and vinyl endblocks on the polymer of (1). As the amount of alkoxysilalkylene endcapping composition used to form the polymer mixture (1) is reduced, the ratio of vinyl endblocks to total endblocks goes up, and the modulus of the sealant produced goes down.

The method of this invention uses polymer mixture of the average formula

where each R is free of aliphatic unsaturation and is of the group monovalent hydrocarbon, monovalent halohydrocarbon, and monovalent cyanoalkyl radicals of 1 to 18 inclusive carbon atoms, each D is selected from the group consisting of the vinyl radical and radicals of the formula

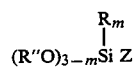

where each R" is at least one selected from the group consisting of methyl, ethyl, propyl, and butyl, Z is a divalent hydrocarbon radical or combination of divalent hydrocarbon radicals and siloxane radicals, m is 0 or 1, and x is of a value such that the polymer has a viscosity of from 0.5 to 3000 Pa.s at 25° C., the amount of vinyl radical of D being from 3 to 40 percent of the total of endblocking radicals D. R can be any of those monovalent hydrocarbon, monovalent halohydrocarbon, or monovalent cyano-alkyl radicals of 1 to 18 inclusive carbon atoms which are known to be useful in silicone sealant materials. The preferred radicals are methyl, ethyl, propyl, phenyl, and trifluoropropyl. Z is a divalent hydrocarbon radical or combination of divalent hydrocarbon radicals and siloxane radicals. The divalent hydrocarbon radical can be from 2 to 15 carbon atoms in the form of a divalent alkylene or arylene radical such as ethylene, propylene, hexylene, phenylene, and

A preferred Z may be represented by the formula

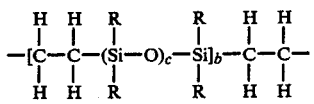

where R is as defined above, b is 0 or 1, and c is from 1 to 6.

The polymer mixture of (1) can be produced by reacting a vinyl endblocked polydiorganosiloxane of the formula

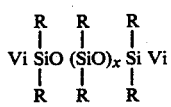 I where each R is as defined above, Vi is vinyl radical, and x is as defined above with an endcapping composition of the formula

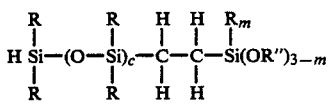 II where R, R", and m are as defined above, and c is 1 to 6. This endcapping composition can be produced by a method comprising (A) mixing 1 mole of a composition (a) of the formula

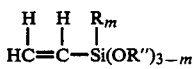

where R, R", and m are as defined above, with greater than 2 moles of a composition (b) of the formula

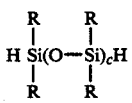

where R and c are as defined above, in the presence of a platinum catalyst and allowing to react, then, (B) optionally stripping the excess composition (b) from the product, to give an endcapping composition of the formula as given above. A preferred endcapping composition is that obtained when c is equal to 1 and m is equal to 0. The above endcapping composition, it's method of manufacture, and it's use in the manufacture of silicone sealants, having an alkoxy functional silane crosslinker and a titanium catalyst, is taught in U.S. patent application No. 148,196, filed Jan. 28, 1988, now U.S. Pat. No. 4,772,675, assigned to the assignee of the instant application, which is hereby incorporated by reference to show the endcapping composition, it's manufacture, and it's use. The polymer produced from the above reaction of vinyl endblocked polydiorganosiloxane (I) and endcapping composition (II) can be represented by the formula

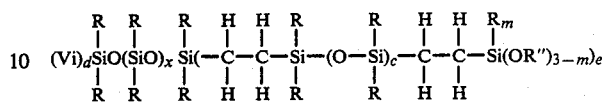

where each R, R", Vi, m, c, and x, are as defined above, and d and e are chosen so that d is on average from 3 to 40 percent of the total of d plus e.

The amount of the endcapping composition (II) used to react with the vinyl endblocked polydiorganosiloxane (I) is chosen so that the desired number of the vinyl endblocking groups are replaced with the alkoxysilethylene endblocking group from (II) on a molar basis. As an example, when the endcapping composition (II) is of the formula

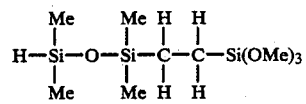

where Me is methyl radical and the vinyl endblocked polydiorganosiloxane (I) is a polydimethylsiloxane having a viscosity of about 55 Pa.s at 25° C. then the degree of endblocking versus the amount of endblocker used can be estimated from the following:

| Parts by Weight of Endblocker | Percent of Alkoxysilethylene Endblocks |
|---|---|
| 0.9 | 100 |
| 0.8 | 89 |
| 0.7 | 78 |
| 0.6 | 67 |
| 0.5 | 55 |

The above polymers can also be produced by using similar siloxanes and silanes in which the location of the hydrogen atom and the vinyl group which react together are reversed.

An alkoxysilane (2) of the formula $R'_aSi(OR'')_{4-a}$ where R' is at least one selected from the group consisting of methyl, ethyl, propyl, phenyl, and vinyl, R" is as defined above, and a is 0, 1 or 2 is added as a moisture scavenger and as a modulus control agent. These alkoxy silanes and their method of manufacture are well known. The amount of alkoxysilane preferably is from 0.1 to 14 parts by weight, with from 2 to 8 parts most preferred. When a is 2, the silane is a chain extender; in this case it is preferable that the polymer (1) be trialkoxy endblocked, so that crosslinking as well as chain extension takes place. It is possible to produce useful sealants without using a crosslinker when the polymer of this invention is present because of the functionality of the polymer itself, but from a practical viewpoint, the crosslinker is useful in that it contributes to the excellent shelf life of the sealant. It is also useful in controlling the degree of crosslinking in the cured elastomeric sealant; more of the trifunctional crosslinker results in a harder, lower elongation elastomer, while more of the difunctional silane acts as a chain extender to give a softer, higher elongation elastomer.

The sealants of this invention are cured through the use of a titanium catalyst (3). The titanium catalyst can be any of those known to be useful in catalyzing the moisture induced reaction of alkoxy containing siloxanes or silanes. Preferred are a titanium catalyst such as titanium naphthenate, titanium esters such as tetrabutyltitanate, tetra-2-ethylhexyltitanate, tetraphenyltitanate, triethanolaminetitanate, organosiloxytitanium compounds such as those described in U.S. Pat. No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, bis-(acetylacetonyl)diisopropyltitanate, and 2,5-di-isopropoxy-bis-ethylacetoacetate titanium. The amount of catalyst is from 0.2 to 6.0 parts by weight per 100 parts by weight of polymer (1). Preferred are from 0.5 to 3.0 parts by weight.

Useful silicone elastomeric sealants are commonly produced with a filler as one of the ingredients. These fillers are well known in the industry. They are added to the mixture to provide reinforcement of the polymer so as to control the physical properties of the sealant after curing. Reinforcing fillers (ingredient 4), such as fumed silica, precipitated silica, and diatomacious earth are used to give the highest physical strengths to the sealants. Reinforcing fillers are generally recognized as being very fine particles having a surface area from about 50 to 700 $m^2/g$. These fillers may be used with untreated filler surfaces or with treated filler surfaces, the treatment being used to modify the filler surface so that it properly reacts with the polymer and the other ingredients in the sealant. Calcium carbonate fillers are now available which are produced by precipitation which have a surface area of about 20 $m^2/g$ that give a reinforcing effect also. Extending fillers such as titanium dioxide, zirconium silicate, calcium carbonate, iron oxide, ground quartz, and carbon black may be used. The amounts of filler used can obviously be varied within wide limits in accordance with the intended use. For example, in some cases the sealant could be used with no filler, but it would have very low physical properties. Reinforcing fillers are commonly used in amounts from about 5 to 60 parts by weight to give the highest physical properties, such as tensile strength. Extending fillers are finely ground in that the average particle size is in the range of from about 1 to 10 micrometers. Extending fillers are used to modify the sealant properties and to provide opacity in some cases.

The method of this invention is used to produce an improved silicone elastomeric sealant, having a controllable modules and good storage stability. A preferred method mixes the polymer (1), having both vinyl and alkoxysilethylene endblocking, with filler (4) if desired, deairing, and adding a deaired mixture of crosslinker (2), and titanium catalyst (3), which are added in the absence of exposure to moisture. The crosslinker (2) and titanium catalyst (3) can be added separately or they can be mixed together and then added as a mixture. They are thoroughly stirred to give a uniform mixture. The uniform mixture is then preferably deaired, then sealed into storage containers, sealant tubes for example, to store it until it is to be used. Another method mixes vinyl endblocked polymer (I) with endcapper (II), then adds filler, crosslinker, and catalyst. The mixture is deaired before storage.

The composition produced by the method of this invention has an improved shelf life when compared to mixtures made with conventional alkoxy endblocked polymers. The composition produced by the method of this invention has a modulus which can be controlled at a desired level by adjusting the ratio of vinyl to alkoxysilalkylene endblocking units in the polymer used. When the composition produced by the method of this invention is exposed to moisture, it cures to give an elastomeric silicone. The composition, when containing filler, is useful as a sealant material for filling spaces and gaps as in sealing buildings particularly where the modulus of the sealant is of importance.

The following examples are included for illustrative purposes only and should not be construed as limiting the invention which is properly set forth in the appended claims. Parts are parts by weight.

EXAMPLE 1

A series of polymers were prepared by reacting 100 parts of dimethylvinylsiloxy endblocked polydimethylsiloxane having a viscosity of about 55 Pa.s at 25° C. with the parts of endcapper as shown in Table I. The endcapper was tetramethyldisiloxane having a trimethoxysilethylene group on one end and a hydrogen atom on the other end. The reaction was run in the presence of 0.01 part of chloroplatinic acid complex of divinyltetramethyldisiloxane diluted with dimethylvinylsiloxy endblocked polydimethylsiloxane to provide 0.7 weight percent platinum as a catalyst. The reaction mixture was stirred for 2 hours, then allowed to age overnight.

Sealants were then prepared from each of the above polymers by mixing 92 parts of the polymer with 8 parts of fumed silica having a surface area of about 250 $m^2/g$, and 1 part of hydroxyl endblocked methyl(trifluoropropyl)polysiloxane having a viscosity of about 0.1 Pa.s at 25° C. and about 6 weight percent hydroxyl radicals as a filler treatment. This base was then mixed in the absence of moisture with 3 parts of methyltrimethoxysilane and 1 part of tetrabutyltitanate. The mixture was placed into a vacuum to remove volatiles, then placed in storage tubes.

After storage, samples of the sealants were extruded from the tubes and formed into test sheets, which were allowed to cure on exposure to the atmosphere for one week at room temperature. Test pieces were then cut from the cured sheets and tested with the results shown in Table I. The durometer was tested according to ASTM D 2240, and the tensile strength and elongation according to ASTM D 412. T/E is the ratio of the ultimate tensile strength divided by the elongation at break.

TABLE I

| Endcapper part | Durometer Shore A | 100% Modulus psi | T/E |
| --- | --- | --- | --- |
| 0.6 | 18 | 50 | 0.43 |
| 0.7 | 25 | 75 | 0.63 |
| 0.8 | 32 | 85 | 0.77 |
| 0.9 | 39 | 115 | 1.02 |
| 1.0 | 38 | 115 | 0.99 |
| 1.1 | 40 | 125 | 1.10 |

EXAMPLE 2

A sealant prepared from a polymer having all trimethylsilethylene endblocking was compared to one prepared from a polymer having about 89 percent trimethylsilethylene endcapping and 11 percent vinyl endcapping.

Polymer A having 100 percent trimethylsilethylene endcapping was prepared as in Example 1 by using 1.1 parts of endcapper per 100 parts of vinyl endblocked polydimethylsiloxane. Polymer B having 89 percent trimethylsilethylene endblocking was prepared as in Example 1 by using 0.8 part of endcapper per 100 parts of polydimethylsiloxane.

Sealants were then prepared from each endblocked polymer by mixing 100 parts of polymer, 10 parts of fumed silica having a surface area of about 150 m²/g, 9 parts of dimethyldimethoxysilane, and 1.6 part of tetrabutyltitanate in the same manner as in Example 1. Each sealant was then subjected to a series of tests, giving the results shown in Table II which compares the prior art sealant produced with a polymer having 100 percent trimethylsilethylene endblocking with a sealant of this invention having about 89 percent trimethylsilethylene endblocking.

The extrusion rate is the weight of sealant extruded in one minute through a ⅛ inch orifice when the sealant is under a pressure of 90 pounds per square inch.

The skin over time is defined as the time required for the material to cure to the point where it no longer adheres to a clean fingertip lightly applied to the surface. The cure conditions are 23° C. and 50 percent relative humidity.

The tack free time is defined as the time in minutes required for a curing material to form a non-tacky surface film. A sample is spread on a clean smooth surface and timing is begun. Periodically, a clean strip of polyethylene film is laid upon a fresh surface and a one ounce weight applied to it. After 4 seconds, the weight is removed and the strip gently pulled off. The time when the strip pulls cleanly away from the sample is recorded as the tack free time.

The adhesion test is a 180 degree peel test which measures the force required to peel a 1 inch wide strip of the sealant off of the surface of the designated substrate. The sealant is applied to the cleaned substrate in a layer of about 0.075 inches thickness, a piece of primed aluminum screen is added as reinforcement, and another layer of sealant is added. After the sealant cures, the one inch wide strip is cut into the sample and one end is cut loose from the substrate at the interface between the substrate and the sealant. The tab formed in attached to a tensile testing machine and the strip is peeled free from the substrate. The percent cohesive failure is the percent of the peeled area where the failure was in the adhesive and not between the adhesive and the substrate at the interface.

TABLE II

|  | Polymer A* | Polymer B |
|---|---|---|
| Initial Properties |  |  |
| Extrusion rate, g/min | 159 | 155 |
| SOT, min | 21 | 18 |
| TFT, min | 34 | 65 |
| Adhesion, pounds/inch/percent cohesive failure |  |  |
| Anodized Al | 1.5/0 | 18/100 |
| Stainless Steel | 2/0 | 16/100 |
| Glass | 8/30 | 17/100 |
| After Aging 1 weeks at 50° C. |  |  |
| Extrusion rate, g/min | 152 | 171 |
| SOT, min | 8 | 10 |
| TFT, min | 20 | 27 |
| Durometer, A | 25 | 16 |
| Elongation, ultimate, % | 671 | 966 |
| Tensile Modulus, psi |  |  |
| ultimate | 408 | 284 |
| at 100% elongation | 79 | 51 |
| After Aging 3 weeks at 50° C. |  |  |
| Extrusion rate, g/min | 128 | 167 |
| SOT, min | 18 | 19 |
| TFT, min | 32 | 26 |
| Durometer, A | 24 | 14 |
| Elongation, ultimate, % | 519 | 713 |
| Tensile Modulus, psi |  |  |
| ultimate | 351 | 195 |
| at 100% elongation | 83 | 53 |

*comparative example

That which is claimed is:

1. A silicone sealant, containing polydiorganosiloxane having alkoxy endblocking, alkoxy functional crosslinker and/or chain extender, and titanium catalyst, produced by a method comprising
   (A) mixing in the absence of moisture
   (1) 100 parts by weight of a polymer mixture of the average formula

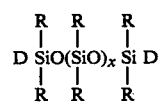

where each R is free of aliphatic unsaturation and is at least one selected from the group consisting of monovalent hydrocarbon, monovalent halohydrocarbon, and monovalent cyanoalkyl radicals of 1 to 18 inclusive carbon atoms, each D is selected from the group consisting of the vinyl radical and radicals of the formula

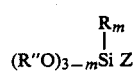

where each R″ is at least one selected from the group consisting of methyl, ethyl, propyl, and butyl, Z is a divalent hydrocarbon radical or combination of divalent hydrocarbon radicals and siloxane radicals, m is 0 or 1, and x is of a value such that the polymer has a viscosity of from 0.5 to 3000 Pa.s at 25° C., from 3 to 40 percent of the total of endblocking radicals D in the polymer mixture being vinyl radicals,
   (2) from 0.1 to 14 parts by weight of an alkoxysilane of the formula

where R′ is at least one selected from the group consisting of methyl, ethyl, propyl, phenyl, and vinyl, R″ is as defined above and a is 0, 1, or 2 and
   (3) from 0.2 to 6 parts by weight of titanium catalyst, and
   (4) optional filler,
(B) storing the mixture in the absence of moisture, to give a sealant which is stable in the absence of moisture and has a modulus which is at a desired level after cure of the sealant.

2. The sealant of claim 1 in which (4) is from 5 to 15 parts by weight of fumed silica.

3. The sealant of claim 2 in which polymer mixture (1) has from 10 to 40 percent vinyl endblocking, m equal to 0, and there is from 2 to 8 parts by weight of alkoxysilane (2) in which a is equal to 2.

4. The sealant of claim 3 in which titanate (3) is tetrabutyltitanate.

* * * * *